May 25, 1965 A. G. BODINE, JR 3,185,871
ALTERNATING CURRENT MAGNETOHYDRODYNAMIC GENERATOR
Filed July 20, 1961 3 Sheets-Sheet 1
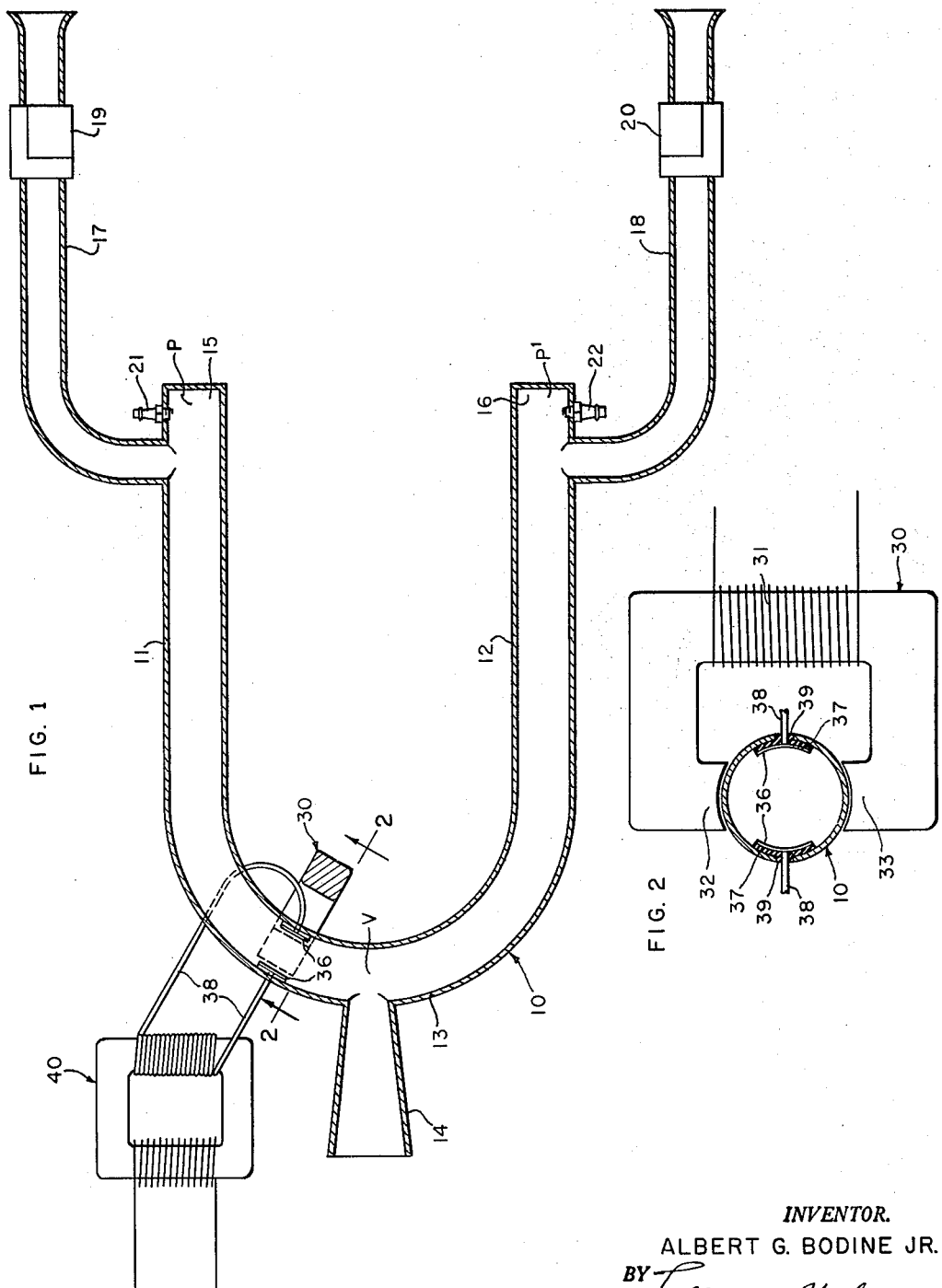
INVENTOR.
ALBERT G. BODINE JR.
BY
Tilly and Nyhagen
ATTORNEYS May 25, 1965 A. G. BODINE, JR 3,185,871
ALTERNATING CURRENT MAGNETOHYDRODYNAMIC GENERATOR
Filed July 20, 1961 3 Sheets-Sheet 2

*INVENTOR.*
ALBERT G. BODINE JR.
BY
ATTORNEYS

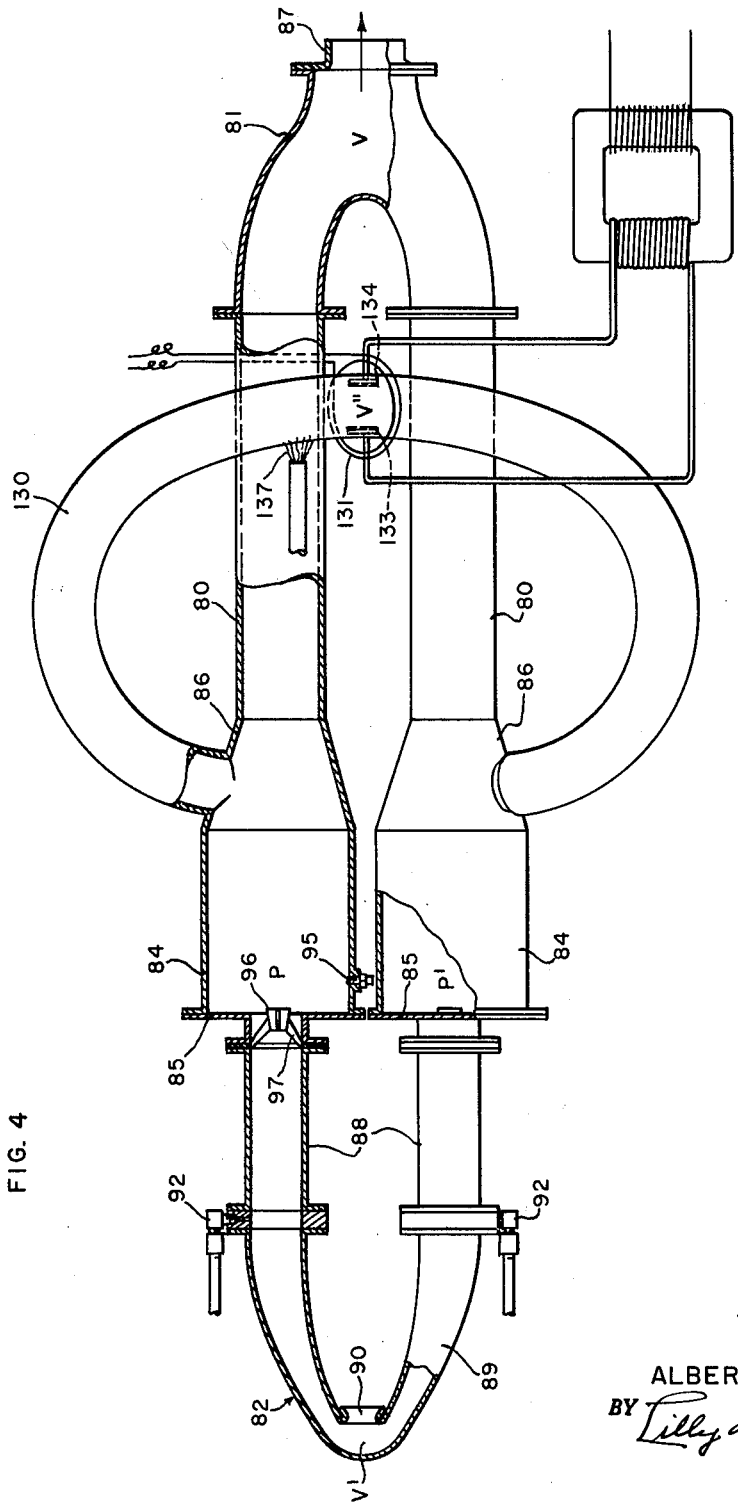

United States Patent Office 3,185,871
Patented May 25, 1965

3,185,871
ALTERNATING CURRENT MAGNETOHYDRO-
DYNAMIC GENERATOR
Albert G. Bodine, Jr., Sherman Oaks, Calif.
(7877 Woodley Ave., Van Nuys, Calif.)
Filed July 20, 1961, Ser. No. 125,532
7 Claims. (Cl. 310—11)

This invention relates generally to the art of magnetohydrodynamics, wherein a conductive fluid travelling through a magnetic field generates electrical current at right angles to the magnetic field and to the direction of fluid flow. The conductive fluid can be a hot ionized gas. Such generators, as heretofore known, deliver a direct current output.

The primary object of the present invention is to provide a magnetohydrodynamic generator which delivers an alternating current output.

The invention accomplishes this objective by using, in its preferred illustrative form, in lieu of the usual unidirectional ionized gas flow through the gas channel containing the magnetic field and output electrodes, an ionized gas column wherein is maintained a sonic standing wave, with a velocity antinode region of the standing wave at the location of the magnetic field and output electrodes. The velocity antinode region of a sonic standing wave is one wherein the gas flow periodically reverses direction in the gas flow channel or conduit. It follows that an alternating current is delivered from the generator.

An advantageous system in accordance with the invention for generating the sonic standing wave is driven by periodic combustion of fuel, and is controlled by autoresonance to produce the standing sound wave of the desired frequency. Examples of heat engines embodying such principles are disclosed in my prior Patent No. 2,796,735. In these engines, the gas velocities attained in the combustion gas conduits at the velocity antinodes therein are of the order of the speed of sound. As will appear, the present invention may be practiced by creating a magnetic field across the gas conduit at a velocity antinode region in any of the embodiments disclosed in said patent, and taking the electric current off in the velocity antinode region at right angles to the magnetic field. It is of course obvious that many gas conduit configurations in which gas oscillation can be established and maintained, in addition to those illustrated in my Patent No. 2,796,735, may be employed in carrying out the invention.

As regards the source of ions in the oscillating gas column, the practice may be the same as heretofore proposed for magnetohydrodynamic generators, including heating, and "seeding" with substances such as potassium powder. Combustion gases are ionized to a substantial extent in any event, and any suitable additives to the fuel such as will improve the source of ion concentration may be employed. With many fuels, the naturally occurring impurities are sufficient to provide adequate additional ionization.

In the drawings, which show a number of selected illustrative embodiments of the invention:

FIG. 1 is a diagrammatic view, in longitudinal section, showing one illustrative form of the invention.

FIG. 2 is a section taken as indicated by line 2—2 of FIG. 1;

FIG. 4 is a diagrammatic view, partly in elevation and partly in section, showing another illustrative embodiment of the invention;

Figure 3:
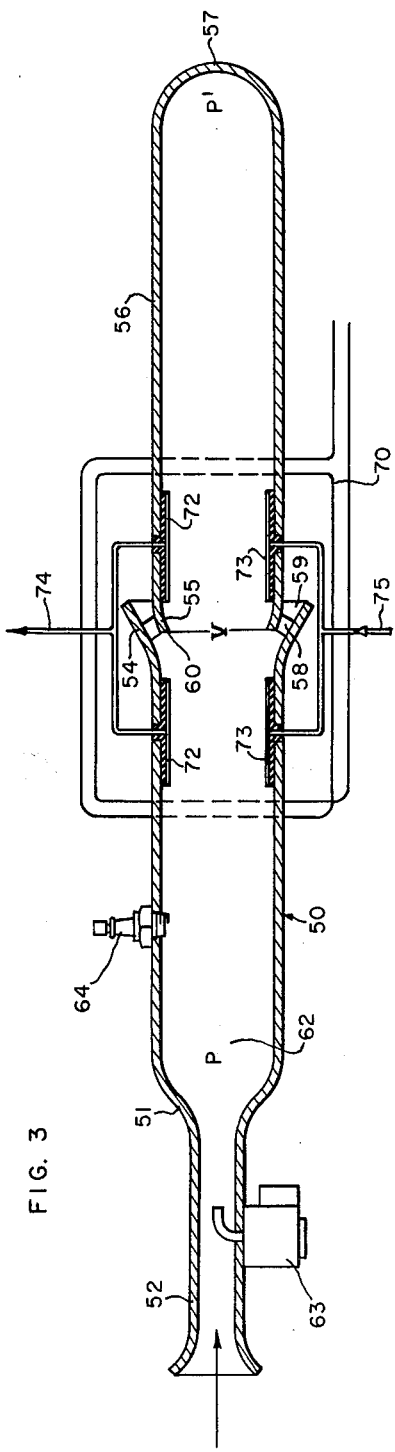
FIG. 3 is a longitudinal section view of an earlier embodiment of the invention, again shown in diagrammatic form.

FIGS. 1 and 2 show an acoustic heat engine which, in basic essentials, is similar to that shown in FIG. 17 of my aforesaid Patent No. 2,796,735, and reference may be had to said patent for a complete description of all details of said engine. In FIG. 1, numeral 10 designates generally a U-shaped sonic pipe, having legs 11 and 12 connected by semi-circular pipe section 13, the latter having, opening from the midpoint of its convex side, a fluid discharge outlet or tailpipe 14. The closed head end regions 15 and 16 of the two legs 11 and 12 form fuel combustion chambers, to which gaseous or fluidized fuel (any of the fossil fuels) is fed through induction pipes 17 and 18, respectively. Air to support combustion enters the forward open ends of the pipes 17 and 18, and fuel is supplied by carburetors 19 and 20, respectively. Combustible mixtures are thus formed which are conveyed via the pipes 17 and 18 to the combustion chambers 15 and 16, respectively. These two induction pipes 17 and 18 are valveless, and to work without valves, have certain necessary impedance characteristics such as fully disclosed in my prior Patents Nos. 2,731,795 and 2,796,735, and the disclosures of which are incorporated herein by reference.

The combustion chamber end portions of the two legs 11 and 12 are furnished with spark plugs 21 and 22, and these are energized cyclically in 180° opposition, each at the resonant frequency of the pipe 10. These spark plugs may be energized by any suitable synchronized ignition system, for instance as disclosed in FIG. 1 of the aforesaid Patent No. 2,731,795.

By energizing the spark plugs cyclically, in 180° opposition, each at the resonant frequency of the pipe 10, the fuel charges delivered to the combustion chamber regions 15 and 16 are exploded alternately, so as to send pressure pulses through the column of gas contained in the U-tube, alternately from one end of the U-tube to the other, the resonant occurrence of the explosions causing a standing wave to be established in the pipe with pressure antinodes P and P′ at the two combustion zones, and with a velocity antinode V in the pipe adjacent the outlet 14. As explained in the aforesaid patents, it is necessary only to use a spark plug for starting, the cyclic process being maintained thereafter with interaction between the combustion and the sound wave.

In the operation of the apparatus, fuel and air mixture thus enters the two combustion chambers via the two induction pipes and these mixtures are alternately exploded to establish the standing wave already mentioned. For a more detailed discussion of standing wave phenomena, reference may be had to my aforesaid Patents 2,739,795, and 2,796,735. At the velocity antinode region V, products of combustion oscillate back and forth around the curved pipe section at maximized velocity and at resonant frequency. Thereby, centrifugal force effects are developed which crowd these oscillating gases to the outer side of the curved pipe section. There, the outer layers of the oscillating gases reach and are forced out the tail pipe, first, by reason of centrifugal force, and second, by reason of the oscillating gas particles being intercepted and deflected outward by the sharp edges at the junction of the pipe 10 with the flaring tailpipe 14. These provisions for inducing discharge of combustion gases create the necessary pressure gradient or differential between the tailpipe 14 and air intake pipes 17 and 18 for pumping of air through the system without the necessity of blowers. Of course, optionally, though not necessarily, blowers can be used in the intake pipes as suggested in Patent No. 2,731,795 (see FIG. 1).

The apparatus as heretofore described is old, and the improvements of the present invention will now be described. Within the extent of the curved section 13 of the U-tube 10, i.e., in the region of the velocity antinode V, a means is provided for creating a magnetic field transversely across the interior of the pipe, and a second means is provided for taking off electrical current flow from the gases in the pipe in a direction transversely of the pipe but at right angles to that of the magnetic field. As here shown, the core of an electromagnet 30, having winding 31, has opposed pole pieces 32 and 33 positioned on opposite sides of the pipe 10 in the velocity antinode region V, such that a magnetic field is created between these pole pieces. The pipe 10 is made of some low magnetic permeability material, such as stainless steel, so that a substantial magnetic field extends inside the pipe and transversely across the gas conduit. Mounted in the pipe in the area of this field are a pair of current collector electrodes 36. These are mounted adjacent opposite sides of the pipe wall, centered on an axis perpendicular to the direction of the magnetic field, and, as diagrammatically shown, are electrically insulated from the pipe by heat resistant ceramic insulators 37. Electrical conductors 38 engage the collector electrodes 36 and extend outwardly through the side wall of the pipe through nipples 39 formed on insulators 37. The conductors 38 are connected to the primary of a suitable transformer 40, the output or secondary winding of which may step the voltage either up or down depending upon the application in hand. Since the output from the generator is characteristically at high current flow, the transformer will generally be a voltage step-up type to deliver a high voltage suitable for transmission.

The operation of the system should now be evident. The gas column in the U-tube will consist of ionized gases, either ionized by reason of the combustion process, or preferably containing a higher concentration of ions than can thereby be attained through use of fuel additives. As already explained, the combustion gases in the curved portion of the U-tube are in a velocity antinode region, and are therefore undergoing rapid oscillation, travelling longitudinally around the curve first in one direction and then the other. With the gas travelling in one direction, it will, in passing through the previously described magnetic field, set up an electrical current flow at right angles to the magnetic field and to the direction of gas flow, and this current flow, or flow of gas ions, is picked up by the spaced collector electrodes 36 and passes through the external circuit including the primary winding of transformer 40. When the gas flow reverses direction, the current flow also reverses direction. Thus an alternating current flow is generated in the primary circuit of the transformer and is delivered from the secondary circuit thereof, usually stepped up in voltage.

It may be mentioned that the combustion driven sound waves of the system tend to generate certain harmonic frequencies, which may appear in the alternating current output. These, however, can be filtered out by means of techniques well understood in the electrical art, so that a good sine wave output is available. In general, it is undesirable to attempt prevention of harmonic frequencies in the sonic system, because these harmonic frequencies have been found to be of benefit to the combustion process.

FIG. 3 shows the application of the invention to a straight tube type of sonic combustion heat engine, such as shown in FIG. 18 of my prior Patent No. 2,796,735. Only a brief description of this heat engine will be given, a reference to said patent may be had for a more complete understanding. In FIG. 3, numeral 50 designates generally a gas conduit or pipe, of generally cylindrical form, having a head portion 51 into which opens fuel and air intake pipe 52. The rear end of pipe 50 is flared or formed with a skirt portion, as indicated at 54, and received within this skirt portion, and annularly spaced therefrom, is the convergent forward end portion 55 of a conduit or pipe extension 56, provided with a closure 57 at the far end, the portion 55 forming a gas deflecting wall element. The skirt part 54 of pipe 50 and the convergent portion or gas deflector 55 of pipe 56 are connected as by means of webs 58, leaving an annular gas passage 59 for discharge of products of combustion. The convergent portion 55 of pipe 56 will be seen to terminate at its forward end in an annular edge 60 spaced inside the pipe 50, and in a position to intercept a portion of the oscillating gas particles travelling from left to right at the juncture of the pipes 50 and 56. As will be seen, the portion of the gas intercepted by the edge 60 is deflected into the annular gas discharge passage 59 and so discharged to atmosphere in a generally outward and rearward direction. It is by this means that the gases are pumped through the system without use of a blower.

The head end region 62 of pipe 50 forms a combustion zone, wherein fuel, supplied to intake pipe 52 as by carburetor 63, together with air taken into the intake pipe and supplied to the region 62, are periodically burned. To instigate combustion, a spark plug 64 is employed, energized by any suitable ignition system, not necessary to illustrate herein.

The pipe sections 50 and 56, taken together, form a half-wavelength resonant acoustic pipe, the section 50 and 56 being each of one quarter wavelength. Periodic explosions taking place in the combustion region 52 at the resonant frequency of members 50 and 56 set up an acoustic standing wave action, producing a pressure antinode P at the combustion region, and a velocity antinode V at the end of pipe section 50. Pipe section 56 is of the same effective length as pipe section 50, and accordingly, a pressure antinode P' is established at the closed end of pipe section 56. Under these circumstances, periodic pressure pulses, at the resonant frequency of the pipe sections, are developed by intermittent combustion at zone 62, causing periodic pressure peaks at regions P and P', and oscillating gas flow longitudinally of the pipe sections 50 and 56 at region V.

An electrically energized field coil 70 positioned on the outside of the pipe section 50 and 56 in the region V establishes a magnetic field transversely through the gas column region V where the gases are maintained in oscillation. As viewed in FIG. 3, this magnetic field is perpendicular to the plane of the paper. The ends of the coil may be curved to conform to the pipe. Of course, an electromagnet such as shown in FIGS. 1 and 2 may be used if desired. It will be understood that the pipe sections 50 and 56 are of some non-magnetically permeable material, so as to permit a good magnetic field inside the gas conduit.

The direction of the magnetic field being perpendicular to the plane of the paper, the path of generated current flow will be in the plane of the paper, and at right angles to the direction of gas flow. In other words, as seen in FIG. 3, the current flow direction is vertical. Accordingly, collector electrodes 72 and 73 are positioned adjacent the upper and lower walls of the pipes, extending throughout the general oscillation region V, each being in the present instance, divided into two halves located on opposite sides of the intermediate gas outlet passage. The upper electrodes 72 are connected to an output conductor 74, and the lower electrodes 73 are connected to an output conductor 75, and it will be understood that the conductors 74 and 75 are the output terminals of the generator, and may, if desired, be connected to the primary of a transformer. It will further be understood that the output current will reverse direction periodically, in step with the reversal of direction of gas flow in the velocity antinode region V.

It was mentioned in the introductory portion of this specification that additives can be introduced into the combustion fuel in order to improve the degree of ionization. In the heat engines previously described, the combustion gases are constantly being discharged from a region relatively close to the point of utilization of the ions present, and an inevitable result is some loss of ionized particles. In the heat engine now to be disclosed, the point of utilization of the ions is located in a portion of the apparatus remote from the point of combustion products discharge, giving the benefit of easier maintenance of high ion concentration in the portion of the apparatus where the ions are utilized. With reference to FIG. 4, the heat engine shown is in basic respects similar to that disclosed in FIG. 22 of my aforementioned Patent No. 2,796,735, and a reference may be had thereto for detailed discussion.

The engine of FIG. 4 has two parallel burner pipes 80, interconnected by a tail pipe fitting 81 at one end of the apparatus, and by a U-tube, or V-tube, valveless air intake means 82 at the opposite end of the apparatus. Each burner pipe 80 has a forward enlarged combustion chamber portion 84, closed by forward head wall 85, and a tapered portion 86, as shown. The tail pipe fitting 81 has two arms flange-fitted to the rearward ends of the two burner pipes, and is in the general form of a Y, the two arms communicating with one another to form a continuous gas conduit connecting the rearward ends of the two burner pipes 80, and the stem forming the tail pipe outlet. Gas travelling from one of these arms to the other will be seen to make a 180° turn. The fitting 81 has a rearwardly directed orifice member 87 through which products of combustion are jetted.

The air intake assembly 82 is in the general form of a U-tube or V-tube, having two leg portions 88 connected into head 85, and joined by a 180° return bend fitting 89, which, in the embodiment of FIG. 4, is somewhat pinched so as to reduce the radius of curvature of the bend. The two legs of fitting 89 are also preferably gradually constricted toward their forward end juncture, as shown. An air intake port 90 opens into the fitting 89 at its inner side, i.e., between its two legs, and the intake air is fed via the two legs of said fitting and the pipes 88 into the combustion chambers 84.

Fuel for combustion may be introduced into the system in various ways, but is here shown as injected by means of fuel injectors 92, in such a way that fuel is injected into the air streams entering the pipes 88 leading into the combustion chambers 84.

Fuel so introduced into the air intake system and conveyed thence to the chambers 84 is ignited in the latter, and ignition may be initiated by means of a spark plug 95 mounted in the side wall of one of the chambers 85. Once ignition has been initiated, a flame lingering in the combustion chamber between explosions is available to burn successive fuel charges, and electric ignition is no longer required. To aid in the retention of this flame between explosions, a turbulizer and flame holder 96 is preferably employed at the head end of the combustion chamber, consisting in this instance of a small cone supported by webs 97. This cone affords a protected region wherein the flame is maintained in an attenuated state between explosions. It is found in practice that a spark plug need be used in only one of the two combustion chambers, since flame in one of the burner pipes will reach fuel in the other, and when the latter has once been exploded, flame thereafter resides in both chambers 84, and is available to set off the accumulating fuel charge whenever the pressure within the combustion chamber is sufficiently elevated by the standing wave pressure cycle therewithin for the desired explosion to occur.

Assuming air for combustion to be fed to the two combustion chambers 84 through the described air intake means, fuel to be injected into this air, and preliminary electric ignition to be provided, a resonant standing wave is established in the two burner pipes, similar to that described in connection with FIG. 1, and need not be again described, excepting to note that a velocity antinode region V appears in the tail pipe fitting 81 as indicated, and pressure antinode regions P and P' appear at the head ends of the combustion chambers 84. The combustion cycle is as in FIG. 1. The lengths of the two air intake paths from the intake port 90 to the combustion chambers 84 are of approximately one-quarter wavelength for a desired component of the resonant standing wave frequency of the twin burner pipes 80 connected by the tail pipe fitting 81, difference in temperature of gases in the air intake pipe system and in the burner pipes being taken into account. A resonant standing wave accordingly is set up in the air intake pipe system, with a velocity antinode appearing at V'. Gas oscillation at resonant frequency accordingly occurs about the sharp bend of the air intake pipe system, opposite the air intake port 90.

Combustion gas discharge is effected from the system through the tail pipe discharge orifice 87, aided by centrifugal force effects as explained in connection with FIG. 1. Air intake into the valveless air feed system 82 occurs inwardly through the air intake port 90, by reason of centrifugal force effects owing to gas oscillation at V'.

The engine of FIG. 4 as thus described is exactly like that of FIG. 22 of the aforesaid Patent No. 2,796,735. In accordance with the present invention, it is modified by connecting into burner pipes 80, preferably in the tapered regions 86 just rearwardly of the combustion chambers, the two ends of a loop pipe 130, whose effective length is equivalent to the distance around a U-shaped path defined by the pipes 80 and fitting 81, rearwardly of the junctions between the pipe 130 and the pipes 80. This auxiliary loop pipe 130, which is in parallel with the gas column down the pipes 80 and around fitting 81, contains a branch column of combustion gas, and a branch standing wave appears in this branch column, driven from the alternate combustion in chambers 84. A velocity antinode V'', i.e., a region of maximized gas oscillation, occurs in the mid-region of pipe 130.

A field coil 131, generally like that of FIG. 3, energized by an electric current, or an electromagnet as in FIGS. 1 and 2, creates a magnetic field transversely, (perpendicular to the paper) across the pipe in the region V'', and collector electrodes 133 and 134, spaced across the pipe along a line at right angles to the direction of the magnetic field, collects the current flow developed. Leads connected to these electrodes may energize the primary winding of a transformer as in FIG. 1. A gas flame 137 is diagrammatically indicated as heating the pipe 130 in the region of the velocity antinode V''. This locally applied heat desirably increases the temperature of the hot gases at the locality where the current is generated.

It will be seen that in the generator of FIG. 4, the gases oscillating in the current generating branch pipe 80 are not in the vicinity of a discharge outlet to atmosphere, and hence it is possible to reduce the loss of ion contributing additives which have been incorporated in the fuel.

Figure 5:
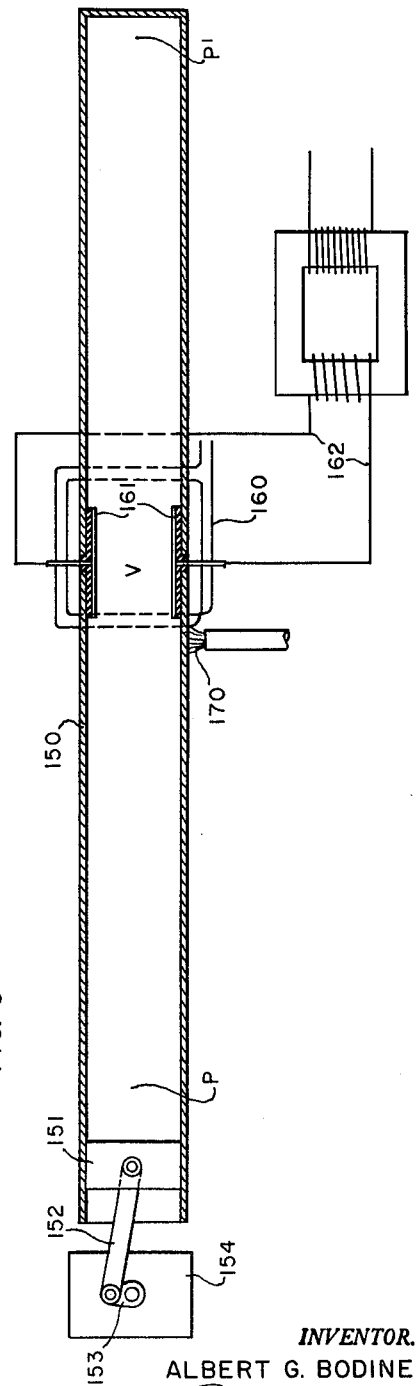
FIG. 5 is a diagrammatic view of another illustrative embodiment of the invention.

In FIG. 5 is shown a modification in which gas oscillations are generated by a piston, rather than a combustion process. A gas filled sonic pipe 150 has a piston 151 fitted for reciprocation in one end thereof, the other end of the pipe 150 being closed. Piston 151 is driven through connecting rod 152 from crank 153 on the rotating shaft of any suitable power source 154, such as an engine. The gas column in pipe 150 is a half wavelength long for the frequency of oscillation of the piston 151, so that a half wavelength standing wave is set up in the pipe, with pressure antinodes P and P' at the ends, and a velocity antinode region V at the mid-portion of the gas column.

A current carrying coil 160 provides a magnetic field transversely across the pipe column in the region V, and current collector electrodes 161 are spaced from one another across the interior of the pipe along an axis at right angles to the direction of the magnetic field. These collector electrodes have output leads 162 which may go to a transformer, as in earlier described forms of the invention.

There is also shown in FIG. 5 a source 170 of heat, such as a flame, applied to the velocity antinode region. This head accomplishes ionization of the gases, and conductivity.

As in the earlier embodiments, the reversing ionized gas flow in the gas oscillation region V generates an alternating current between the collector electrodes 161 and the leads 162.

My sonic magnetohydrodynamic generator has many advantages over those heretofore known, including: (1) generation of A.C. current, (2) no blowers and other mechanical moving parts are essential, (3) ion contributing additives are conserved, and (4) gas temperatures in the current generation region are conserved.

A number of my preferred magnetohydrodynamic generators have now been described. It will be understood, however, that these are for illustrative purposes only and that numerous changes in design, structure and arrangement may be made without departing from the scope of the appended claims.

I claim:

1. In a magnetohydrodynamic generator, the combination of: a conduit containing a column of gas, means for setting up and maintaining in said column a longitudinal sonic standing wave, with at least one velocity antinode therealong, means for ionizing at least that portion of the gas in the region of said velocity antinode, means for setting up a magnetic field transversely across said gas column in said conduit in the region of said velocity antinode, whereby an alternating electric current flows transversely across said gas column at right angles to said magnetic field, and collector means and an output circuit for said alternating current.

2. The subject matter of claim 1, including a source of local heat for the velocity antinode region of said gas column.

3. In a magnetohydrodynamic generator, the combination of: a conduit containing a column of gas, means for setting up and maintaining in said column a longitudinal sonic standing wave, with at least one velocity antinode and one pressure antinode therealong, said means for setting up and maintaining said standing wave comprising means for intermittently burning fuel charges in said gas column in the region of said pressure antinode, means for setting up a magnetic field transversely across said gas column in said conduit in the region of said velocity antinode, whereby an alternating electric current flows transversely across said gas column at right angles to said magnetic field, and collector means and an output circuit for said alternating current.

4. In a magnetohydrodynamic generator, the combination of: a gas conduit containing a gas column of half wavelength for a predetermined resonant standing wave frequency, said conduit having fuel combustion chambers at each of its ends, means for feeding fuel and air to said combustion chambers, means for igniting the mixture in at least one of said chambers, a combustion products discharge outlet in the mid-region of said conduit, all in such manner that a half wavelength standing wave is established in said conduit with pressure antinodes at said combustion chambers, and a velocity antinode at said mid-region of said conduit, means for setting up a magnetic field transversely across said gas column in said conduit in the region of said velocity antinode, whereby an alternating electric current flows transversely across said gas column at right angles to said magnetic field, and collector means and an output circuit for said alternating current.

5. In a magnetohydrodynamic generator, the combination of: a gas conduit containing a gas column of half wavelength for a predetermined resonant standing wave frequency, said conduit having a fuel combustion chamber at each of its ends, means for feeding fuel and air to said combustion chambers, means for igniting the mixture in at least one of said chambers, whereby ionized combustion gas products are released to said conduit, a combustion products discharge outlet in the mid-region of said conduit, a gas containing branch conduit having two ends joining the first mentioned conduit at two points upstream from and on opposite sides of said outlet, and of a length such that the distance between combustion chambers measured via said branch conduit is of the order of a half wave length, whereby a velocity antinode is created in said branch conduit, means for setting up a magnetic field transversely across said branch conduit in the region of said velocity antinode therein, whereby an alternating electric current flows transversely across said gas column at right angles to said magnetic field, and collector means and an output circuit for said alternating current.

6. The subject matter of claim 5, including also a means for locally heating the gas column in said branch conduit in the vicinity of said velocity antinode therein.

7. The subject matter of claim 1, wherein said standing wave has a pressure antinode therein, and said means for setting up and maintaining said standing wave comprises a reciprocating piston in said conduit in the general region of said pressure antinode.

References Cited by the Examiner

UNITED STATES PATENTS

| | | | |
|---|---|---|---|
| 1,916,076 | 6/33 | Rupp | 310—11 |
| 2,796,735 | 6/57 | Bodine | 60—39.77 |
| 3,034,002 | 5/62 | Carlson | 310—11 |

MILTON O. HIRSHFIELD, *Primary Examiner.*

DAVID X. SLINEY, *Examiner.*